US009950751B2

(12) United States Patent
Heil et al.

(10) Patent No.: US 9,950,751 B2
(45) Date of Patent: Apr. 24, 2018

(54) AERODYNAMIC SYSTEM AND METHOD FOR DIAGNOSING THE AERODYNAMIC SYSTEM AND VERIFY DOWNFORCE ESTIMATION BASED ON ELECTRIC MOTOR CURRENT

(71) Applicant: GM GLOBAL TECHNOLOGY OPERATIONS LLC, Detroit, MI (US)

(72) Inventors: Edward T. Heil, Howell, MI (US); Joshua R. Auden, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

(21) Appl. No.: 15/229,762

(22) Filed: Aug. 5, 2016

(65) Prior Publication Data
US 2017/0088193 A1 Mar. 30, 2017

Related U.S. Application Data

(60) Provisional application No. 62/232,913, filed on Sep. 25, 2015.

(51) Int. Cl.
| | |
|---|---|
| B60J 9/00 | (2006.01) |
| B62D 35/00 | (2006.01) |
| G01M 9/06 | (2006.01) |
| B62D 37/02 | (2006.01) |
| G01M 9/08 | (2006.01) |

(52) U.S. Cl.
CPC .......... *B62D 35/00* (2013.01); *B62D 35/005* (2013.01); *B62D 35/007* (2013.01); *B62D 37/02* (2013.01); *G01M 9/06* (2013.01); *G01M 9/08* (2013.01)

(58) Field of Classification Search
CPC ...... B62D 37/02; B62D 35/007; B62D 35/00; B62D 35/005; Y02T 10/88
USPC .......................................................... 296/180.1
See application file for complete search history.

(56) References Cited

U.S. PATENT DOCUMENTS

| | | | | |
|---|---|---|---|---|
| 3,455,594 A | * | 7/1969 | Mrlik ..................... | B60G 17/00 188/270 |
| 3,601,794 A | * | 8/1971 | Blomenkamp ........ | B60Q 1/444 188/181 A |
| 3,623,745 A | * | 11/1971 | Taylor ................... | B60G 17/00 280/124.161 |
| 4,174,863 A | * | 11/1979 | Gotz .................... | B62D 35/007 296/180.5 |

(Continued)

*Primary Examiner* — Kiran B Patel
(74) *Attorney, Agent, or Firm* — Quinn IP Law

(57) ABSTRACT

A method can be executed to diagnose an aerodynamic system and includes the following steps: (a) determining, via a controller, a first expected downforce acting on an aerodynamic element of a vehicle based, at least in part, on a current position of the aerodynamic element relative to a vehicle body of the vehicle, wherein an electric motor is operatively coupled to the aerodynamic element; (b) determining, via the controller, a second expected downforce acting on the aerodynamic element of the vehicle based, at least in part, on an electrical current used to move the electric motor in order to move the aerodynamic element from the current position to another position; (c) determining a deviation, via the controller, based on the first expected downforce and the second expected downforce; and (d) controlling, via the controller, the aerodynamic element based, at least in part, on the deviation.

20 Claims, 4 Drawing Sheets

(56) References Cited

U.S. PATENT DOCUMENTS

| | | | | |
|---|---|---|---|---|
| 4,558,898 | A * | 12/1985 | Deaver | B62D 35/007 264/251 |
| 4,629,240 | A * | 12/1986 | Dornier | B62D 35/007 180/903 |
| 4,674,788 | A * | 6/1987 | Ohmura | B62D 35/007 296/180.5 |
| 4,688,840 | A * | 8/1987 | Kretschmer | B62D 35/007 296/180.1 |
| 4,772,062 | A * | 9/1988 | Janssen | B62D 35/007 296/180.5 |
| 4,810,022 | A * | 3/1989 | Takagi | B62D 35/005 180/197 |
| 4,854,635 | A * | 8/1989 | Durm | B62D 35/007 296/180.1 |
| 4,887,681 | A * | 12/1989 | Durm | B60K 11/08 180/68.1 |
| 4,889,382 | A * | 12/1989 | Burst | B60K 11/08 180/68.1 |
| 5,095,255 | A * | 3/1992 | Honda | B60S 1/245 15/250.13 |
| 5,141,281 | A * | 8/1992 | Eger | B62D 35/007 296/180.5 |
| 5,236,242 | A * | 8/1993 | Seeman | B62D 35/001 296/180.1 |
| 5,454,619 | A * | 10/1995 | Haraway, Jr. | B62D 35/007 180/903 |
| 5,923,245 | A * | 7/1999 | Klatt | B60Q 1/302 180/68.3 |
| 6,030,028 | A * | 2/2000 | Radmanic | B62D 35/007 296/146.16 |
| 6,139,090 | A * | 10/2000 | Stidd | B62D 35/007 180/903 |
| 6,170,904 | B1 * | 1/2001 | Schaedlich | B62D 35/007 180/903 |
| 6,193,302 | B1 * | 2/2001 | Won | B62D 35/007 180/903 |
| 6,196,620 | B1 * | 3/2001 | Haraway, Jr. | B62D 35/007 180/903 |
| 6,338,524 | B1 * | 1/2002 | Wu | B62D 35/007 180/903 |
| 6,378,932 | B1 * | 4/2002 | Fasel | B62D 35/001 180/903 |
| 6,540,282 | B2 * | 4/2003 | Pettey | B62D 35/007 180/903 |
| 6,575,522 | B2 * | 6/2003 | Borghi | B62D 35/005 296/180.1 |
| 6,712,424 | B2 * | 3/2004 | Swain | B60R 9/06 224/519 |
| 6,926,346 | B1 * | 8/2005 | Wong | B62D 35/001 296/180.1 |
| 7,052,074 | B2 * | 5/2006 | Dringenberg | B62D 35/007 296/180.5 |
| 7,201,432 | B2 * | 4/2007 | Roth | B62D 35/007 296/180.5 |
| 7,213,870 | B1 * | 5/2007 | Williams | B62D 35/007 296/180.3 |
| 7,578,542 | B2 * | 8/2009 | Schreiber | B60Q 1/0017 296/180.5 |
| 7,578,543 | B2 * | 8/2009 | Wegener | B62D 35/007 296/180.3 |
| D607,386 | S * | 1/2010 | Kulla | D12/181 |
| 7,686,382 | B2 * | 3/2010 | Rober | B62D 35/007 296/180.1 |
| 7,708,335 | B2 * | 5/2010 | Wegener | B60T 1/16 296/180.1 |
| 7,841,646 | B2 * | 11/2010 | Paul | B62D 37/02 296/180.1 |
| 8,177,288 | B2 * | 5/2012 | Molnar | B62D 35/007 296/180.5 |
| 8,474,763 | B2 * | 7/2013 | Schroeder | B64C 3/50 244/213 |
| 8,602,486 | B2 * | 12/2013 | Roemer | B62D 35/007 296/180.5 |
| 8,641,127 | B2 * | 2/2014 | Ramsay | B62D 35/00 296/180.1 |
| 8,926,000 | B2 * | 1/2015 | del Gaizo | B62D 35/02 296/180.5 |
| 9,102,366 | B1 * | 8/2015 | Kim | B62D 35/005 |
| 9,132,868 | B2 * | 9/2015 | Shiga | B62D 35/007 |
| 9,216,644 | B2 * | 12/2015 | Cardile | B60H 1/241 |
| 9,266,571 | B2 * | 2/2016 | D'Arcy | B62D 35/005 |
| 9,283,999 | B2 * | 3/2016 | Wolf | B62D 35/007 |
| 9,308,950 | B2 * | 4/2016 | Wolf | B62D 35/005 |
| 9,333,994 | B1 * | 5/2016 | Fahland | G05D 3/00 |
| 9,352,791 | B2 * | 5/2016 | Wolf | B62D 35/007 |
| 9,381,957 | B1 * | 7/2016 | Auden | B62D 35/007 |
| 9,399,493 | B1 * | 7/2016 | Milde, Jr. | B62D 25/12 |
| 9,403,564 | B1 * | 8/2016 | Al-Huwaider | B62D 35/007 |
| 9,469,355 | B2 * | 10/2016 | Wolf | B62D 35/007 |
| 9,561,827 | B2 * | 2/2017 | Parry-Williams | B62D 37/02 |
| 9,713,947 | B2 * | 7/2017 | Irwin | B60G 17/0165 |
| 9,714,056 | B2 * | 7/2017 | Handzel, Jr. | B62D 35/00 |
| 9,764,615 | B2 * | 9/2017 | Mosher | B60G 99/006 |
| 9,776,675 | B1 * | 10/2017 | Berger | B62D 35/007 |
| 2005/0077753 | A1 * | 4/2005 | Burg | B62D 35/007 296/180.5 |
| 2007/0063541 | A1 * | 3/2007 | Browne | B62D 35/00 296/180.1 |
| 2008/0116717 | A1 * | 5/2008 | Honeycutt | B62D 35/007 296/180.5 |
| 2009/0256387 | A1 * | 10/2009 | Pfertner | B60J 7/043 296/180.3 |
| 2013/0221701 | A1 * | 8/2013 | De Luca | B62D 35/007 296/180.5 |
| 2013/0226414 | A1 * | 8/2013 | De Luca | B62D 35/007 701/49 |
| 2014/0021742 | A1 * | 1/2014 | Durm | B62D 35/007 296/180.5 |
| 2015/0084371 | A1 * | 3/2015 | Ribaldone | B62D 35/00 296/180.1 |
| 2016/0159412 | A1 * | 6/2016 | Oxley | B62D 35/007 296/180.5 |
| 2016/0251041 | A1 * | 9/2016 | Wolf | B62D 35/007 296/180.1 |
| 2016/0304139 | A1 * | 10/2016 | Handzel, Jr. | B62D 35/00 |
| 2017/0080770 | A1 * | 3/2017 | Irwin | B60G 17/0165 |
| 2017/0080908 | A1 * | 3/2017 | Morgan | B60T 8/17551 |
| 2017/0088106 | A1 * | 3/2017 | Fahland | B60T 8/1766 |
| 2017/0088192 | A1 * | 3/2017 | Auden | B62D 35/00 |
| 2017/0088194 | A1 * | 3/2017 | Heil | B62D 35/00 |
| 2017/0088197 | A1 * | 3/2017 | Heil | B62D 35/005 |
| 2017/0088200 | A1 * | 3/2017 | Heil | B62D 35/005 |
| 2017/0092022 | A1 * | 3/2017 | Heil | B62D 35/005 |
| 2017/0151984 | A1 * | 6/2017 | Bray | B62D 35/007 |
| 2017/0282738 | A1 * | 10/2017 | Miller | B60L 1/02 |

* cited by examiner

AERODYNAMIC SYSTEM AND METHOD FOR DIAGNOSING THE AERODYNAMIC SYSTEM AND VERIFY DOWNFORCE ESTIMATION BASED ON ELECTRIC MOTOR CURRENT

CROSS-REFERENCE TO RELATED APPLICATION

The present application claims priority to, and the benefit of, U.S. Provisional Patent Application No. 62/232,913, filed on Sep. 29, 2015, the entire disclosure of which is incorporated by reference.

TECHNICAL FIELD

The present disclosure relates to an aerodynamic system for a vehicle and a method for diagnosing an aerodynamic system and verifying a downforce estimation using motor control feedback signals.

BACKGROUND

Some vehicles include aerodynamic elements. These aerodynamic elements are part of the vehicle aerodynamic system and can affect vehicle aerodynamic factors, such as vehicle drag, wind noise, vehicle noise emissions, and lift forces.

SUMMARY

The present disclosure relates to a method for diagnosing an aerodynamic system and verifying a downforce estimation. The vehicle aerodynamic system includes at least one aerodynamic element, such as a spoiler, coupled to the vehicle body. The presently disclosed method estimates the downforce acting on the aerodynamic element, thereby increasing the level of confidence in the reported aerodynamic conditions of the vehicle in comparison with conventional vehicles. This increased level of confidence allows other vehicle controllers to use this downforce information, thereby enhancing the vehicle performance by providing the driver with an improved handling refinement under, for example, racetrack conditions.

In one embodiment, the method includes the following steps: (a) determining, via a controller, a first expected downforce acting on an aerodynamic element of the vehicle based, at least in part, on a current position of the aerodynamic element relative to a vehicle body of the vehicle, wherein an electric motor is operatively coupled to the aerodynamic element; (b) determining, via the controller, a second expected downforce acting on the aerodynamic element of the vehicle based, at least in part, on an electrical current required (or used) to move the electric motor in order to move the aerodynamic element from the current position to another position; (c) determining a deviation, via the controller, based, at least in part, on the first expected downforce and the second expected downforce; and (d) controlling, via the controller, the aerodynamic element based, at least in part, on the deviation.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
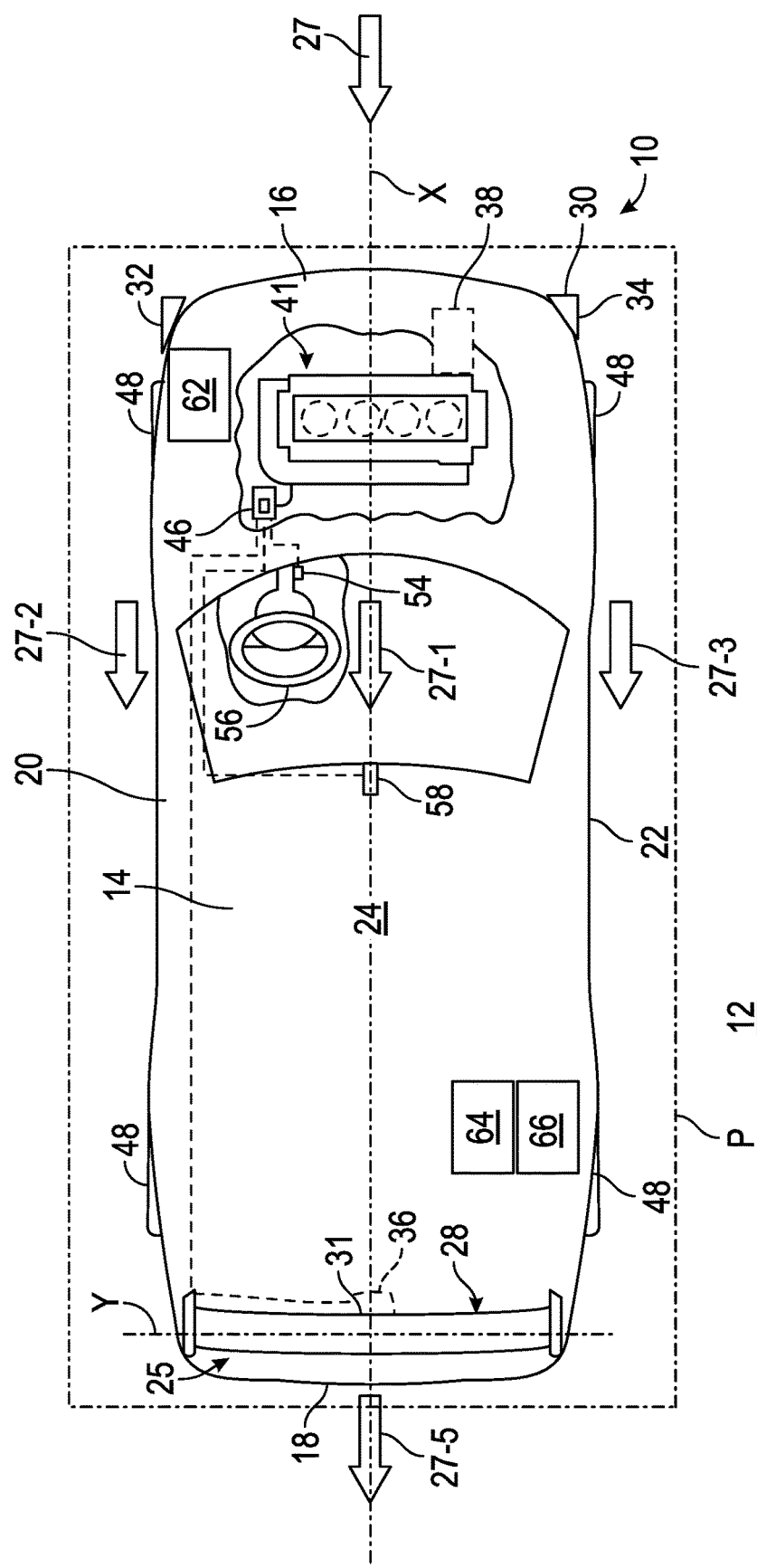
FIG. 1 is a schematic top view of a vehicle in accordance with the embodiment of the present disclosure.
Figure 2:
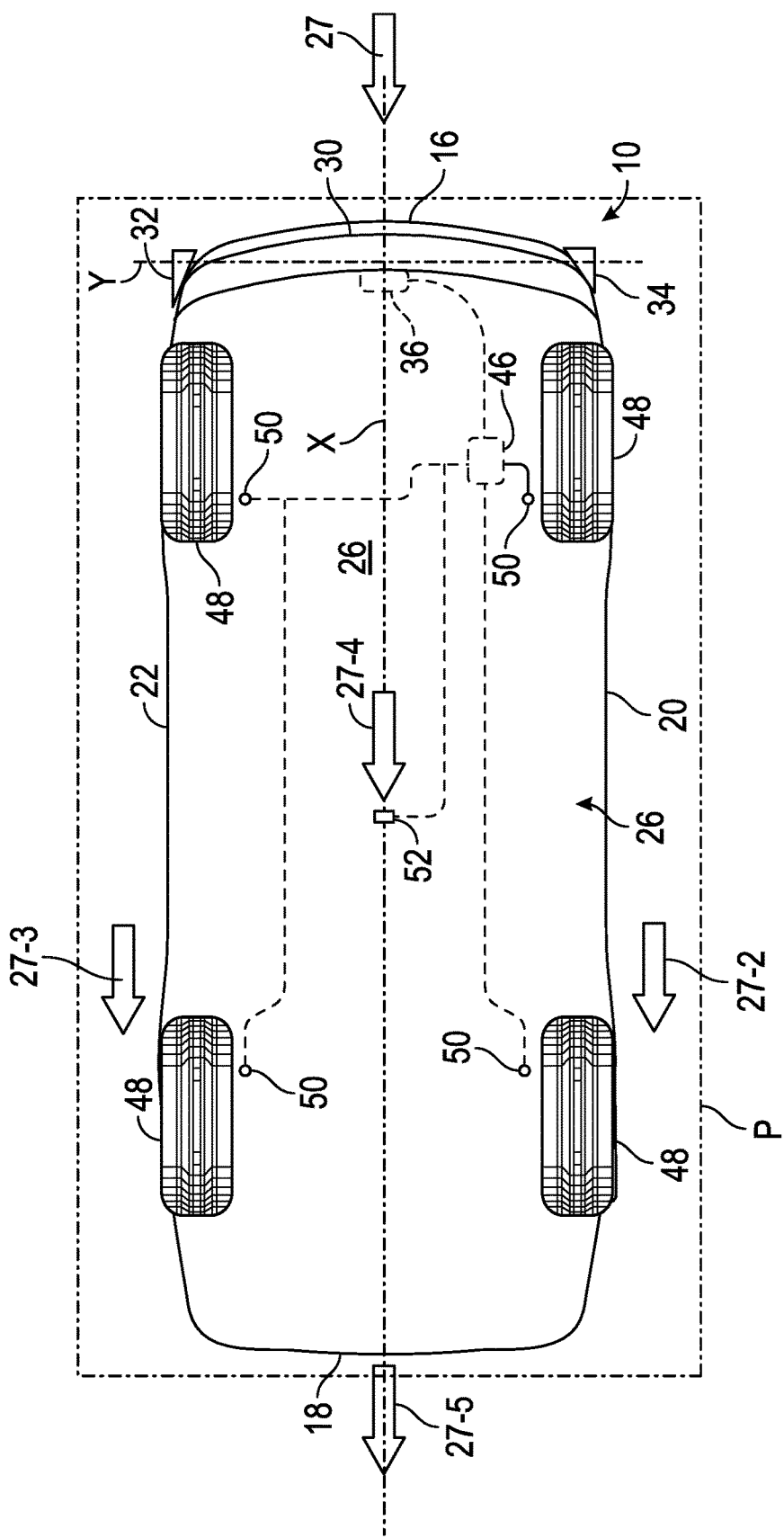
FIG. 2 is a schematic bottom view of the vehicle shown in FIG. 1 in accordance with the embodiment of the present disclosure.
Figure 3:
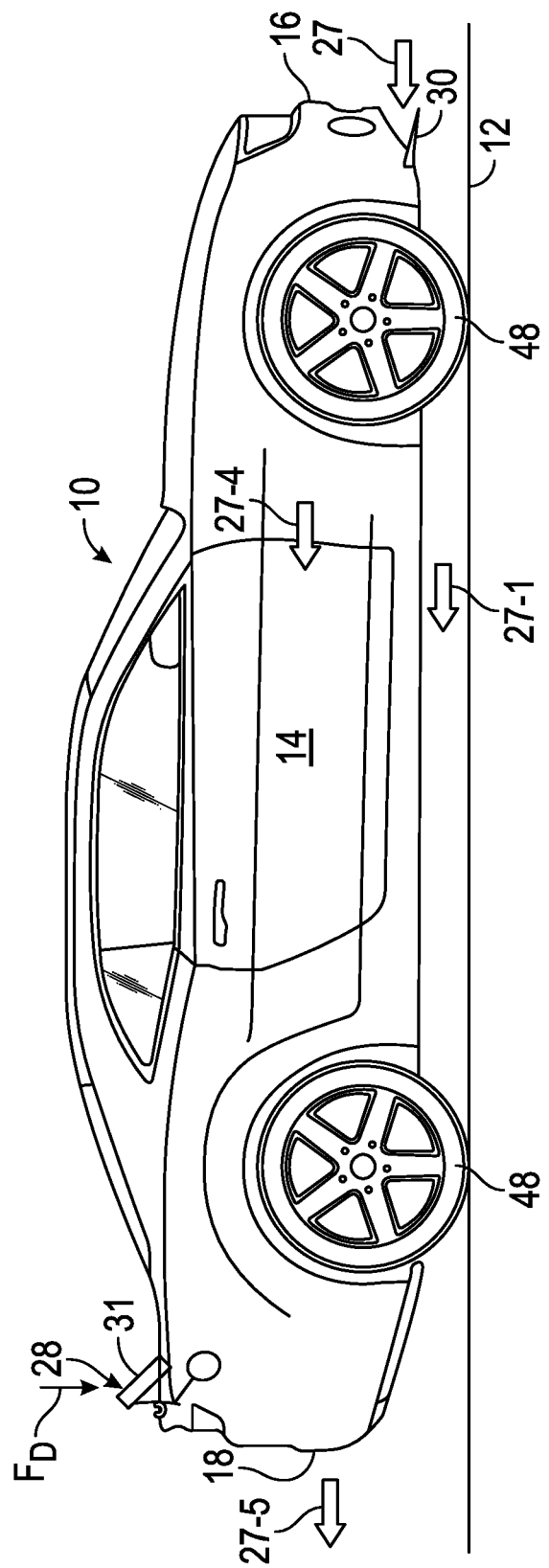
FIG. 3 is a schematic side view of the vehicle shown in FIGS. 1 and 2 in accordance with the embodiment of the present disclosure.

Referring to the drawings, wherein like reference numbers refer to like components, FIG. 1 shows a top schematic view, FIG. 2 shows a bottom schematic view, and FIG. 3 shows a side schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26. The vehicle 10 includes a drivetrain having a power plant 41 that mechanically couples via a geartrain to one or a plurality of road wheels 48 to transfer mechanical power thereto. The power plant 41 may be an internal combustion engine (shown in FIG. 1), a hybrid-electric powertrain (not shown), or another alternative type of power plant, and the geartrain may be an automatic transmission or another suitable geartrain. The motor vehicle 10 may be any suitable motor vehicle, including, by way of non-limiting examples, a passenger vehicle, a high-performance vehicle, an off-road vehicle, an autonomous vehicle, and a military-use vehicle.

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the vehicle body 14. The front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into a first airflow portion 27-1, second airflow portion 27-2, third airflow portion 27-3, and fourth airflow portion 27-4, that eventually rejoin in a wake area or recirculating airflow region 27-5 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. The recirculating airflow region 27-5 is generally caused at elevated vehicle speeds by the flow of surrounding air around the six body sides of the vehicle body 14.

The vehicle 10 includes an active aerodynamic system 25 including at least a first or rear aerodynamic assembly 28. The first aerodynamic assembly 28 includes an aerodynamic element 31 arranged along an aerodynamic element axis Y and configured to control movement of the ambient airflow 27 along the vehicle body 14. The aerodynamic element 31 may be configured as a wing-shaped spoiler. "Wing-shaped" is herein defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle body 14 while the vehicle 10 is in motion, thereby reducing drag and/or inducing a downforce FD on the vehicle 10. For example, the spoiler can diffuse air by increasing the amount of turbulence flowing over it. Moreover, the aerodynamic element 31 may be formed from a suitably rigid but low mass material, such as an engineered plastic or aluminum, for structural stability. As can be seen in FIG. 1, the aerodynamic element axis Y may be positioned transversely (e.g., perpendicular) to the longitudinal body axis X. Additionally, the aerodynamic element axis Y is also arranged substantially parallel to the body plane P. The first aerodynamic assembly 28 may be directly connected to the vehicle body 14. The first aerodynamic assembly 28 varies a downforce FD exerted by the ambient airflow 27 at the rear of the vehicle 10. The term "downforce" means a force component that is perpendicular to the direction of relative motion of the vehicle 10, i.e., in the longitudinal direction, toward the road surface 12.

Figure 4:
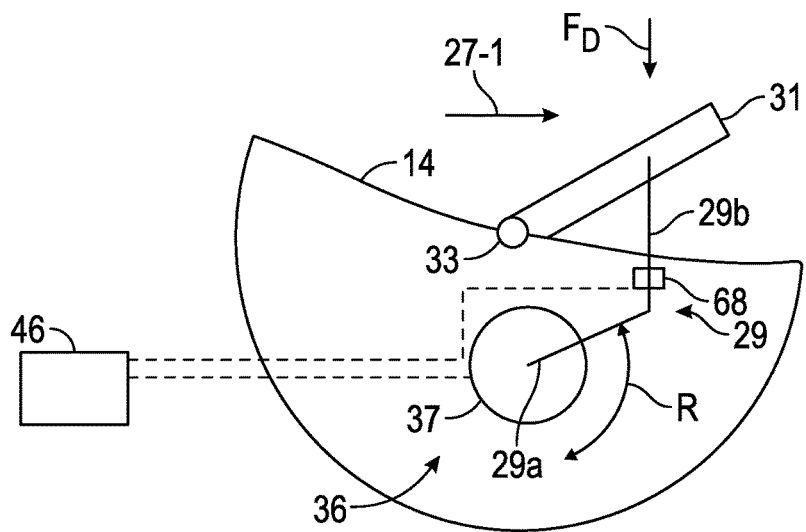
FIG. 4 is a schematic, partial side view of a vehicle body, an aerodynamic element coupled to the vehicle body, and an electric motor operatively coupled to the aerodynamic element in accordance with the embodiment of the present disclosure.

Referring to FIG. 4, the first aerodynamic assembly 28 also includes a first or rear actuation mechanism 36 configured to adjust the position of the aerodynamic element 31 relative to the vehicle body 14. In the depicted embodiment, the first actuation mechanism 36 includes an actuator electric motor 37 operatively coupled to the aerodynamic element 31. As such, upon receipt of a control signal, the electric motor 37 can move the aerodynamic element 31 relative to the vehicle body 14.

The first aerodynamic assembly 28 further includes a linkage 29 coupled between the aerodynamic element 31 and the electric motor 37, and a hinge 33 may rotationally couple the aerodynamic element 31 to the vehicle body 14. The linkage 29 can move upon activation of the electric motor 37, thereby allowing the aerodynamic element 31 to pivot relative to the vehicle body 14 about the hinge 33. In the depicted embodiment, the linkage 29 includes a first link 29a and a second link 29b directly connected to the first link 29a. The first link 29a is directly connected to the electric motor 37 and can pivot about the electric motor 37 in the rotational directions indicated by double arrow R. The second link 29b can be directly connected to the aerodynamic element 31. Consequently, the second link 29b can cause the aerodynamic element 31 to rotate about the hinge 33 upon activation of the electric motor 37. By rotating the aerodynamic element 31 relative to the vehicle body 14, an angle of attack (not shown) of the aerodynamic element 31 can be adjusted.

In addition to the first aerodynamic assembly 28, the aerodynamic system 25 may include a second or front aerodynamic assembly 30, which may function as an air dam (also known as a Gurney flap) that varies a downforce exerted by the ambient airflow 27 at the front of the vehicle. The Gurney flap could be positioned at the back part of the wing, which is the front underbody area in the front of the tires. The second aerodynamic assembly 30 may be employed to increase the downforce at the front of the vehicle, whereas the first aerodynamic assembly 28 mounted on the rear end 18 may be employed to increase the downforce FD at the rear of the vehicle 10 in order to increase vehicle traction. The second aerodynamic assembly 30 may be formed from a suitably rigid but low mass material, such as an engineered plastic or aluminum, for structural stability. Further, the second aerodynamic assembly 30 may include a first, left winglet 32 and a second, right winglet 34, each arranged substantially transversely with respect to aerodynamic element axis Y and each arranged substantially vertically relative to the road surface 12 and facing the incident ambient airflow 27. As a result, the winglets 32, 34 facilitate trapping pockets of air when the vehicle 10 is in motion. A second or front actuation mechanism 38 is configured to alter the position of the front first and second winglets 32, 34 in response to a control signal. For example, the second actuation mechanism 38 can selectively shift each of the first winglet 32 and the second winglet 34 in a direction substantially transverse to the longitudinal body axis X, and thereby adjust a magnitude of the aerodynamic downforce generated by the second aerodynamic assembly 30. Movements of the first and second winglets 32, 34 may be facilitated by linear actuators, rotary actuators, and/or electric motors (not shown in detail, but understood by those skilled in the art).

The vehicle 10 includes a plurality of sensors for monitoring vehicle operation related to vehicle ride and handling. A plurality of first sensors 50 may be arranged on the vehicle body 14 for detecting rotating speeds of each road wheel 48 (shown in FIG. 2). Each first sensor 50 may also be configured to communicate the detected rotating speed of the respective road wheel 48 to a controller 46, while the controller 46 can be configured to correlate the data received from the respective first sensors 50 to road speed of the vehicle 10. The vehicle 10 may also include one or more second sensors 52 (shown in FIG. 2) configured to detect a yaw moment or rate on the vehicle body 14 relative to the road surface 12 and communicate the detected yaw rate to the controller 46. The second sensors 52 may be also referred to as yaw sensors. Additionally, the vehicle 10 may include a third sensor 54 operatively connected to a steering wheel 56 (shown in FIG. 1) and configured to detect an angle of the steering wheel 56 during operation of the vehicle. An intended direction of the vehicle 10 may be identified by the steering wheel angle detected by the third sensor 54 and communicated to the controller 46. The vehicle 10 may additionally include a fourth sensor 58 (shown in FIG. 1) configured to detect a velocity of ambient airflow 27 relative to the vehicle 10. The fourth sensor 58 may be additionally configured to communicate the detected velocity of the ambient airflow 27 to the controller 46. The fourth sensor 58 may be, for example, a pitot tube configured to detect a pressure of the ambient airflow 27 at a specific location relative to the vehicle body 14. The controller 46 can correlate the measured pressure to airflow velocity. The vehicle 10 further includes at least one fifth sensor 68 (shown in FIG. 4) configured to detect the position of the aerodynamic element 31 relative to the vehicle body 14. Accordingly, the fifth sensor 68 is also referred to as a position sensor. The fifth sensor 68 can also communicate the position of the aerodynamic element 31 relative to the vehicle body 14 to the controller 46. It is contemplated that the vehicle 10 may include only one fifth sensor 68. The aforementioned sensors are each in communication (e.g., electronic communication) with the controller 46 and may be in the form of rotational position sensors, linear position sensors, ultrasonic sensors, laser sensors and inertial-based acceleration sensors. A heading angle calculation may be determined from a pitot tube or other vehicle dynamics information providing inertial estimates. Air density calculation may be derived from manifold absolute pressure and outside air temperatures.

The vehicle 10 includes one or a plurality of systems for actively controlling vehicle ride and handling. This may include one or more routines for controlling position(s) of the first and second aerodynamic assemblies 28, 30. This may include an active suspension system 62 that is configured to adjust suspension damping and/or front and rear ride heights in response to a control signal that is based upon operating conditions. The vehicle 10 may include an active braking system 64 that may include anti-lock braking and other features. The vehicle 10 may include an active steering system 66 that may control vehicle steering rates in response to operating conditions.

The controller 46 is an electronic device that is configured, i.e., constructed and programmed, to regulate the first actuation mechanism 36. The controller 46 may be configured as a central processing unit (CPU) that is also configured to regulate operation of the power plant 41, or, alternatively a dedicated controller. In order to appropriately control operation of the first actuation mechanism 36, the controller 46 includes a processor and at least one memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 46 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 46 may also include a floppy disk, a flexible disk, hard disk, magnetic tape, any other magnetic medium, a CD-ROM, DVD, any other optical medium, etc. The controller 46 can be configured or equipped with other computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms used by the controller 46 or accessible thereby may be stored in the memory and automatically executed to provide the desired functionality.

The controller 46 may also be configured to regulate the second actuation mechanism 38 and may be a dedicated controller or have functions that are integrated into another controller. In order to appropriately control operation of the second actuation mechanism 38, the controller 46 includes a memory, at least some of which is tangible and non-transitory. The memory may be any recordable medium that participates in providing computer-readable data or process instructions. Such a medium may take many forms, including but not limited to non-volatile media and volatile media.

The controller 46 may selectively control one or more of the first actuation mechanism 36, the second actuation mechanism 38, the active suspension system 62, the active braking system 64, and the active steering system 66 in response to the yaw rate detected by the second sensor 52. For example, the controller 46 is in electronic communication with the electric motor 37 and can therefore control its operation in order to adjust the position of the aerodynamic element 31 relative to the vehicle body 14. Furthermore, the controller 46 may be configured to control one or more of the first actuation mechanism 36, the second actuation mechanism 38, the active suspension system 62, the active braking system 64, and the active steering system 66 in response to the rotating speeds of the road wheels 48 detected via the first sensor 50 and/or the velocity of the ambient airflow 27 detected via the fourth sensor 58. The controller 46 may be additionally programmed to determine a slip of the vehicle 10 relative to the road surface 12. The slip of the vehicle 10 may include a measure of how much each of the road wheels 48 has slipped in a direction that is generally perpendicular to the longitudinal vehicle axis X, which identifies that the vehicle 10 has deviated from the intended direction or path along the road surface 12 as identified by the steering wheel angle detected by the third sensor 54. The controller 46 may be programmed to compare the determined steering wheel angle and yaw rate to determine how much the vehicle 10 had deviated from its intended direction or path.

Overall, controlling an active vehicle suspension system includes determining expected vehicle aerodynamic responses associated with a plurality of controlled vehicle parameters. The expected vehicle aerodynamic responses may be employed during vehicle operation, including determining actual vehicle parameters during vehicle operation and dynamically estimating a vehicle aerodynamic response during the vehicle operation based upon the expected vehicle aerodynamic responses associated with the controlled vehicle parameters. Control parameters associated with the active vehicle suspension system may be dynamically controlled in response to the dynamically estimated vehicle aerodynamic response to actively control parameters related to vehicle ride and handling. This operation is described with reference to FIG. 5, as follows.

Figure 5:
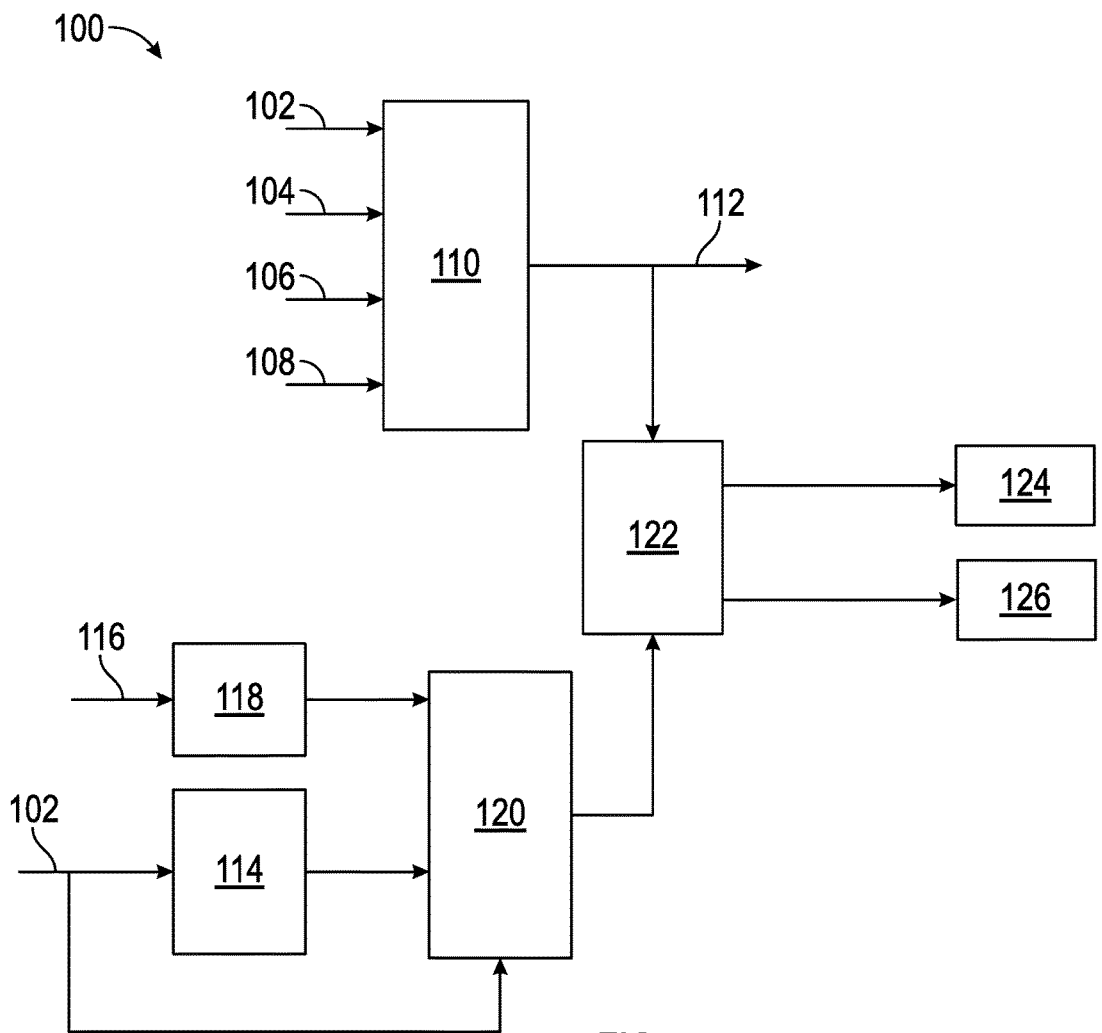
FIG. 5 is a schematic flowchart of a method for controlling an aerodynamic system of the vehicle shown in FIG. 1 in accordance with the embodiment of the present disclosure.

FIG. 5 schematically illustrates a method 100 for diagnosing the aerodynamic system 25 of the vehicle 10 and verifying the downforce estimation using motor control feedback signals. In particular, the method 100 includes instructions (or steps), which may be stored on and executed by the controller 46. In other words, the controller 46 is specifically programmed to execute the method 100. As discussed below, the method 100 estimates the downforce FD acting on the aerodynamic element 31, thereby increasing the level of confidence in the reported aerodynamic force in comparison to a vehicle that does not employ a direct method for estimating the aerodynamic downforce. This increased level of confidence allows other vehicle controllers to use this downforce information, thereby enhancing the vehicle performance by providing the driver with an improved handling refinement under, for example, racetrack conditions.

The method 100 includes a plurality of input steps 102, 104, 106, and 108, which may be executed simultaneously or in any suitable chronological order. At step 102, the controller 46 receives an input signal indicative of the current position of the aerodynamic element 31 relative to the vehicle body 14. In the depicted embodiment, the fifth sensor 68 (i.e., the position sensor) communicates a signal indicative of the current position of the aerodynamic element 31 to the controller 46. Based on this input signal, the controller 46 determines the current position of the aerodynamic element 31 relative to the vehicle body 14. Thus, step 102 also entails determining, via the controller 46, the current position of the aerodynamic element 31 based on, for example, an input signal generated by the fifth sensor 68.

At step 104, the controller 46 receives an input signal indicative of the vehicle velocity. This input signal may be generated by the first sensors 50, which can measure the rotating speeds of each road wheel 48. Therefore, in the depicted embodiment, the controller 46 can determine the vehicle velocity based, at least in part, on the input signal received from the first sensors 50. Thus, step 104 also entails determining, via the controller 46, the vehicle speed based on, for example, an input signal generated by the first sensors 50.

At step 106, the controller 46 receives an input signal indicative of a vehicle height estimation. The vehicle ride height estimation may be determined using experimental results based on vehicle operating factors, such as the drag force acting on the vehicle, the air density, and the air velocity. A method of using chassis position sensors can also be utilized, as described in U.S. Provisional Patent Application No. 62/220,010, filed on Sep. 17, 2015, the entire disclosure of which is incorporated by reference herein. By way of a non-limiting example, the vehicle 10 may be evaluated in a wind tunnel to experimentally derive an aerodynamic characteristic map of the subject vehicle that may be subsequently employed. A wind tunnel simulates movement of air around a vehicle under controlled wind speed, temperature and other conditions to determine magnitudes of forces acting upon the vehicle with the vehicle controlled under various parameters. Such parameters include front and rear vehicle ride height, pitch, roll, heading angle, air velocity, vehicle velocity, and position(s) of one or more aerodynamic actuators such as front and rear aerodynamic elements. An empirical model may be developed, which includes, for example, a multi-level full factorial matrix for evaluating the subject vehicle. At step 106, the controller 46 employs this empirical model to determine (e.g., estimate) the vehicle ride height. An example of a suitable empirical model for estimating vehicle ride height is described in U.S. Provisional Patent Application No. 62/220,010, filed on Sep. 17, 2015, which is incorporated by reference herein in its entirety.

At step 108, the controller 46 receives input signals indicative of other aerodynamic factors, such as air density, roll, pitch, yaw and heading angle. Air density calculation may be derived from manifold absolute pressure and outside air temperatures. A heading angle calculation may be determined from a pitot tube or other vehicle dynamics information providing inertial estimates. Therefore, the controller 46 can determine the heading angle based, at least in part, on input signals from the fourth sensor 58. As discussed above, the fourth sensor 58 may be, for example, a pitot tube configured to detect a pressure of the ambient airflow 27 at a specific location relative to the vehicle body 14. The controller 46 can determine vehicle pitch and roll based, at least in part, on input signals from the third sensor 54. An example of a suitable empirical model for determining vehicle roll and pitch is described in U.S. Provisional Patent Application No. 62/220,010, filed on Sep. 17, 2015, which is incorporated by reference herein in its entirety. As discussed above, the third sensor 54 can detect an angle of the steering wheel 56 during operation of the vehicle 10 and can therefore be referred as the steering sensors. The controller 46 can determine the vehicle yaw based, at least in part, on input signals from the second sensors 52. As discussed above, the second sensors 52 can detect a yaw moment or rate on the vehicle body 14 relative to the road surface 12 and communicate the detected yaw rate to the controller 46.

After executing steps 102, 104, 106, and 108, the method 100 proceeds to step 110. At step 110, the controller 46 determines (e.g., estimates) an expected downforce acting on the aerodynamic element 31 based, at least in part, on the current position of the aerodynamic element 31 relative to the vehicle body 14, the vehicle velocity, the vehicle ride height, as well as other aerodynamic factors, such as air density, roll, pitch, yaw and heading angle. In other words, the controller 46 determines the expected downforce acting on the aerodynamic element 31 based, at least in part, on the input signals received in steps 102, 104, 106, and 108. To do so, the controller 46 employs an empirically-developed vehicle model. This vehicle model may be derived, for example, by subjecting the vehicle 10 to wind tunnel experimentation as discussed above. The wind tunnel simulates movement of air around a vehicle under controlled wind speed, temperature and other conditions to determine magnitudes of forces acting upon the vehicle 10, such as the downforce, with the vehicle controlled under various parameters. In the present disclosure, the expected downforce determined based on the current position of the aerodynamic element 31 relative to the vehicle body 14, the vehicle velocity, the vehicle ride height, as well as other aerodynamic factors, such as air density, roll, pitch, yaw and heading angle is referred to as the first expected downforce. After determining the first expected downforce acting on the aerodynamic element 31, the method 100 proceeds to step 112.

At step 112, the controller 46 communicates the first expected downforce acting on the aerodynamic element 31 to other vehicle controllers. For example, the expected downforce can be communicated to vehicle controllers that influence the vehicle yaw (i.e., yaw influencing controllers), such as an Electronic Stability Control (ESC) system. These other vehicle controllers can employ the expected downforce information to enhance vehicle performance.

The method 100 further includes step 114. At step 114, the controller 46 determines (i.e., estimates) the actuation force necessary to move the aerodynamic element 31 from its current position to another position (e.g., a predetermined position). The term "actuation force" means the force that the electric motor 37 needs to generate in order to overcome the friction forces and inertial forces preventing the aerodynamic element 31 from moving from its current position to another position. The electric motor 37 generates a torque that is translated into a force through the linkage ratio that is defined by the geometry of links 29a and 29b. The controller 46 can determine the inertial forces and the friction forces to be overcome to move the aerodynamic element 31 from its current position. Accordingly, at step 114, the controller 46 estimates the actuation force of the electric motor 37 using, among other things, the input signal received from the fifth sensors 68 (at step 108), which is indicative of the current position of the aerodynamic element 31 relative to the vehicle body 14. Step 114 can be achieved by employing an empirically-developed model of the electric motor 37 and the aerodynamic element 31. The "actuation force" determined in step 114 does not take into account the aerodynamic forces acting on the vehicle 10 or the aerodynamic element 31.

The method 100 also includes step 116. At step 116, the controller 46 receives an input signal from the electric motor 37 that is indicative of the electrical current required (or used) to move the electric motor 37 in order to move the aerodynamic element 31 from its current position to another position (e.g., a predetermined position). As discussed below, this electrical current is proportional to the downforce FD being applied to the aerodynamic element 31. Thus, the method 100 uses the motor control feedback signals (originating from the electric motor 37) to diagnose the aerodynamic system 25 and verify the downforce estimation. After step 116, the method 100 proceeds to step 118.

At step 118, the controller 46 determines (e.g., estimates) the motor torque and force based, at least in part, on the input signal indicative of the electrical current received in step 116. In other words, the controller 46 correlates the magnitude of the electrical current of the electric motor 37 to the motor torque and motor force generated by the electric motor 37. To do so, the controller 46 can employ an empirically-developed model of the electric motor 37. This estimated motor force denotes the amount of force that the electric motor 37 is generating in order to move the aerodynamic element 31 from its current position to another position (e.g., predetermined position). Accordingly, this estimated motor torque takes into account the downforce FD acting on the aerodynamic element 31. After determining the estimated motor torque and the actuation force, the method 100 proceeds to step 120.

At step 120, the controller 46 determines (e.g., estimates) the downforce exerted on the aerodynamic element 31 based, at least in part, on the motor force determined in step 118 and the actuation force determined in step 114. In one embodiment, the controller 46 subtracts the actuation force from the motor force in order to determine the downforce acting on the aerodynamic element 31. At step 120, the controller 46 may also take into account the current position of the aerodynamic element 31 relative to the vehicle body 14 in order to determine the downforce. The downforce determined in step 120 may be referred to as the second expected downforce. After determining the first expected downforce and the second expected downforce, the method 100 continues to step 122.

At step 122, the controller 46 determines a deviation between the first expected downforce determined in step 110 and the second expected downforce determined in step 120 (i.e., the force deviation). In one embodiment, the controller 46 subtracts the second expected downforce from the first expected downforce to determine the deviation between the first expected downforce and the second expected downforce. Then, the method 100 continues to step 124.

At step 124, the controller 46 controls the operation of the aerodynamic element 31 based, at least in part, on the force deviation determined in step 122. For instance, the controller 46 can command the first actuation mechanism 36 (which includes the electric motor 37) to adjust the position of the aerodynamic element 31 relative to the vehicle body 14 based on the force deviation determined in step 122. As a non-limiting example, the controller 46 can compare the force deviation (determined in step 122) with a first predetermined threshold and a second predetermined threshold, which is greater than the first predetermined threshold. If the force deviation is less than the first predetermined threshold (i.e., the measured downforce is low), then the controller 46 commands the first actuation mechanism 36 (and the electric motor 37) to adjust the position of the aerodynamic element 31 in order increase the downforce FD acting on the aerodynamic element 31. In doing so, the first actuation mechanism 36 can increase or decrease the angle of attack of the aerodynamic element 31. Further, if the force deviation is greater than the second predetermined threshold (i.e., the measured downforce is high), then the controller 46 commands the first actuation mechanism 36 (and the electric motor 37) to adjust the position of the aerodynamic element 31 in order decrease the downforce FD acting on the aerodynamic element 31.

Moreover, after determining the force deviation in step 122, the method 100 also executes step 126. At step 126, the controller 46 provides a diagnosis status to other vehicle controllers based on the force deviation. In other words, other vehicle controllers can employ the force deviation to diagnose the aerodynamic system 25. For instance, another controller can limit the vehicle speed based on the force deviation communicated by the controller 46. Further, a sensitive electronic stability control (ESC) can be activated based on the force deviation, and/or the ESC can modify the vehicle dynamic models based on the force deviation. The force deviation can also be used, by the controller 46 or other vehicle controllers, to verify the downforce estimation determined in step 110.

At step 122, the controller 46 may also define a force estimate diagnostic flag. The force estimate flag is a computer logic flag indicating whether the controller 46 has determined if the estimated downforce from the current vehicle operating conditions is or is not a valid estimate of the downforce FD acting on the vehicle 10 at the aerodynamic element 31. The controller 46 may pass the force estimate diagnostic flag onto the other vehicle control systems so that they may control their respective vehicle systems more accurately. The force estimate diagnostic flag may be defined as valid when the deviation is equal to or less than a maximum allowable value. The force estimate diagnostic flag may be defined as non-valid when the deviation is greater than the maximum allowable value. The maximum allowable value may be defined based on the specific vehicle performance characteristics, or some other criteria, and represents an allowable range for the estimated downforce from current vehicle operating conditions.

While the best modes for carrying out the teachings have been described in detail, those familiar with the art to which this disclosure relates will recognize various alternative designs and embodiments for practicing the teachings within the scope of the appended claims.

The invention claimed is:

1. A method, comprising:
   determining, via a controller, a first expected downforce acting on an aerodynamic element of a vehicle based, at least in part, on a current position of the aerodynamic element relative to a vehicle body of a vehicle, wherein an actuation mechanism comprising an electric motor is operatively coupled to the aerodynamic element;
   determining, via the controller, a second expected downforce acting on the aerodynamic element of the vehicle based, at least in part, on an electrical current used to move the electric motor in order to move the aerodynamic element from the current position to another position;
   determining a deviation, via the controller, based, at least in part, on the first expected downforce and the second expected downforce; and
   controlling, via the controller, the aerodynamic element based, at least in part, on the deviation.

2. The method of claim 1, further comprising determining a motor force used to move the electric motor based on the electrical current used to move the electric motor in order to move the aerodynamic element from the current position to another position.

3. The method of claim 2, wherein the second expected downforce is based, at least in part, on the motor force.

4. The method of claim 3, further comprising determining an actuation force of the electric motor to move the aerodynamic element from the current position.

5. The method of claim 4, wherein the second expected downforce is based, at least in part, on the motor force and the actuation force.

6. The method of claim 5, wherein determining the second expected downforce includes subtracting the actuation force from the motor force.

7. The method of claim 1, wherein determining the deviation includes subtracting the second expected downforce from the first expected downforce.

8. The method of claim 1, further comprising commanding the actuation mechanism to move the aerodynamic element relative to the vehicle body.

9. The method of claim 8, further comprising commanding the actuation mechanism to move the aerodynamic element relative to the vehicle body when the deviation is less than a first predetermined threshold.

10. The method of claim 9, further comprising commanding the actuation mechanism to move the aerodynamic element relative to the vehicle body when the deviation is greater than a second predetermined threshold, wherein the second predetermined threshold is greater than the first predetermined threshold.

11. The method of claim 1, further comprising communicating the deviation to other controllers.

12. The method of claim 1, further comprising providing a diagnosis status to other controllers based on the deviation.

13. A vehicle, comprising:
a vehicle body;
an aerodynamic element movably coupled to the vehicle body;
an actuation mechanism comprising an electric motor coupled to the aerodynamic element;
a controller in communication with the electric motor, wherein the controller is programmed to:
determine a first expected downforce acting on the aerodynamic element of the vehicle based, at least in part, on a current position of the aerodynamic element relative to the vehicle body;
determine a second expected downforce acting on the aerodynamic element of the vehicle based, at least in part, on an electrical current used to actuate the electric motor in order to move the aerodynamic element from the current position to another position;
determine a deviation based, at least in part, on the first expected downforce and the second expected downforce; and
control the aerodynamic element based, at least in part, on the deviation.

14. The vehicle of claim 13, wherein the controller is programmed to determine a motor force used to move the electric motor based on the electrical current used to move the electric motor in order to move the aerodynamic element from the current position to another position.

15. The vehicle of claim 14, wherein the second expected downforce is based, at least in part, on the motor force.

16. The vehicle of claim 15, wherein the controller is programmed to determine an actuation force that the electric motor needs to generate in order to move the aerodynamic element from the current position.

17. The vehicle of claim 16, wherein the second expected downforce is based, at least in part, on the motor force and the actuation force.

18. The vehicle of claim 17, wherein the controller is programmed to determine the second expected downforce by subtracting the actuation force from the motor force.

19. The vehicle of claim 13, wherein the controller is programmed to determine the deviation by subtracting the second expected downforce from the first expected downforce.

20. The vehicle of claim 13, wherein the controller is programmed to command the actuation mechanism to move the aerodynamic element relative to the vehicle body.

* * * * *